(12) United States Patent
Matsuo et al.

(10) Patent No.: US 8,158,286 B2
(45) Date of Patent: Apr. 17, 2012

(54) ENERGY STATIONS

(75) Inventors: Shiro Matsuo, Torrance, CA (US); Akifumi Otaka, Tochigi (JP); Arne Ballantine, Round Lake, NY (US)

(73) Assignee: Honda Motor Co., Ltd., Tokyo (JP)

( * ) Notice: Subject to any disclaimer, the term of this patent is extended or adjusted under 35 U.S.C. 154(b) by 1487 days.

(21) Appl. No.: 11/205,391

(22) Filed: Aug. 17, 2005

(65) Prior Publication Data
US 2007/0042241 A1 Feb. 22, 2007

(51) Int. Cl.
H01M 8/18 (2006.01)

(52) U.S. Cl. ........................................ 429/411; 429/444

(58) Field of Classification Search ............... 429/21, 429/24, 411, 422, 444, 515, 900, 901; 204/242
See application file for complete search history.

(56) References Cited

U.S. PATENT DOCUMENTS

| | | | | |
|---|---|---|---|---|
| 5,527,632 | A | 6/1996 | Gardner | 429/27 |
| 5,635,039 | A | 6/1997 | Cisar et al. | 204/252 |
| 6,152,191 | A | 11/2000 | Chan et al. | 141/18 |
| 6,280,865 | B1 | 8/2001 | Eisman et al. | 429/17 |
| 6,316,134 | B1 | 11/2001 | Cownden et al. | 429/410 |
| 6,432,283 | B1 | 8/2002 | Fairlie et al. | 204/230.2 |
| 6,745,105 | B1 | 6/2004 | Fairlie et al. | 700/273 |
| 7,045,233 | B2 | 5/2006 | McElroy et al. | 429/19 |
| 7,132,182 | B2 | 11/2006 | McElroy et al. | 429/17 |
| 7,141,323 | B2 | 11/2006 | Ballantine et al. | 429/17 |
| 7,252,900 | B2 | 8/2007 | Ballantine et al. | 429/13 |
| 2001/0033954 | A1 | 10/2001 | Gyoten et al. | 429/21 |
| 2002/0082747 | A1* | 6/2002 | Kramer | 700/276 |
| 2003/0155252 | A1 | 8/2003 | Juda et al. | 205/354 |
| 2004/0028960 | A1 | 2/2004 | McElroy et al. | 429/13 |
| 2004/0028979 | A1 | 2/2004 | Ballantine et al. | 429/34 |
| 2004/0098179 | A1* | 5/2004 | Sokoloski et al. | 701/29 |
| 2005/0000802 | A1* | 1/2005 | Hobbs | 204/277 |

(Continued)

FOREIGN PATENT DOCUMENTS

DE 198 14 106 A1 10/1998

(Continued)

OTHER PUBLICATIONS

Sedlak et al., "Hydrogen Recovery and Purification Using the Solid Polymer Electrolyte Electrolysis Cell," Int. J. Hydrogen Energy, vol. 6, pp. 45-51 (1981).

(Continued)

*Primary Examiner* — Cynthia H. Kelly
*Assistant Examiner* — Monique Wills
(74) *Attorney, Agent, or Firm* — Nelson Mullins Riley & Scarborough LLP; Anthony A. Laurentano

(57) ABSTRACT

An energy station includes a generating unit and a separate remotely located dispensing unit. The generating unit includes a housing having an electrolyzer for generating hydrogen and a storage unit for storing hydrogen from the electrolyzer. The dispensing unit includes a housing for dispensing hydrogen from the generating unit. The generating unit is located at a first location and the dispensing unit is located at a second location away from the first location. For example, the generating unit may be located outside the building and the dispensing unit may be located inside a garage. Also disclosed is a generating unit having a fuel cell for supplying electricity to the building and a heat exchanger for supplying heat to the building.

35 Claims, 13 Drawing Sheets

U.S. PATENT DOCUMENTS

| | | | | |
|---|---|---|---|---|
| 2005/0053813 | A1 | 3/2005 | Ballantine et al. | 429/22 |
| 2006/0068246 | A1 | 3/2006 | Matsuo et al. | 429/19 |
| 2007/0034507 | A1 | 2/2007 | Sin et al. | 204/290.1 |
| 2007/0196702 | A1* | 8/2007 | Sridhar et al. | 429/17 |
| 2007/0254195 | A1 | 11/2007 | Ballantine et al. | 429/21 |
| 2009/0048716 | A1* | 2/2009 | Marhoefer | 700/291 |

FOREIGN PATENT DOCUMENTS

| | | |
|---|---|---|
| DE | 200 02 118 U1 | 6/2001 |
| JP | 2002-269633 | 9/2002 |
| JP | 2002-544389 | 12/2002 |
| JP | 2003-120426 | 4/2003 |
| JP | 2003-517177 | 5/2003 |
| JP | 2004-7963 | 1/2004 |
| JP | 2005-24061 | 1/2005 |
| WO | 2004/050798 A2 | 6/2004 |
| WO | WO 2004/086534 A2 | 10/2004 |

OTHER PUBLICATIONS

Matsuo et al., "Energy Stations", U.S. Appl. No. 11/205,394, filed Aug. 17, 2005, 22 pp.

Phill by FuelMaker—Fuel Maker Vehicle Refueling Appliance Operating Instructions, FuelMaker Corporation, Issue 5, Mar. 2005—17 pages.

Phill by FuelMaker—Fuel Maker Vehicle Refueling Appliance Installation Instructions, FuelMaker Corporation, Issue 5, Mar. 2005—25 pages.

Phill by FuelMaker—Fuel Your Car At Home; http://www.myphill.com/index.htm—4 pages.

"Hydrogen Fuelling Infrastructure Available from FuelMaker," http://fuelmaker.com/News/PressReleases/News_5.htm, Aug. 2001, 1 page.

"Refuel FCVs at home with FuelMaker device,", Vicki P. McConnell, http://fuelmaker.com/News/Media/FuelFCVatHome.htm.—2 pages.

"Hydrogen Refueling," http://www.fuelmaker.com/Products/HydrogenRefueling/—2 pages.

Stuart Energy Station, http://stuartenergy.com/our_products/stuart_entery_station.html—8 pages.

Stuart Energy Station Brochure—12 pages.

Japanese Office Action for Application No. 2006-222620, dated Apr. 26, 2011.

* cited by examiner

ENERGY STATIONS

CROSS REFERENCE TO RELATED APPLICATION

This application is related to U.S. patent application Ser. No. 11/205,394, entitled "Energy Stations" filed concurrently, the entire subject matter of which is incorporated herein by reference.

FIELD OF THE INVENTION

This invention relates generally to vehicle refueling appliances, and more particularly, to energy stations for generating hydrogen for vehicles and for generating electricity and heat for a home or a building.

BACKGROUND OF THE INVENTION

Hydrogen is an important zero emission fuel. Recently, development of hydrogen fuel infrastructure systems has become a priority to support the use of hydrogen as a fuel.

An important part of a hydrogen fuel infrastructure system is generation of hydrogen. Two methods are generally used for generating hydrogen. One method for generating hydrogen includes an electrolysis process in which electrical energy is used to split water molecules into hydrogen and oxygen. Another method for generating hydrogen includes a reforming process, e.g., converting hydrocarbon fuel such as natural gas or propane into a hydrogen-rich gas. With either method, the hydrogen is often purified and/or compressed so that it can be stored for later use. Electrochemical hydrogen pumps have been used for hydrogen purification and/or compression of hydrogen-rich gas.

An industrial hydrogen energy station, featuring the co-generation of hydrogen fuel and electric power, was operated at the Las Vegas Fleet and Transportation Services Center, in Las Vegas Nev. The station provided both hydrogen and compressed natural gas/hydrogen vehicles. The station included separate stand-alone units for each of a reformer, a fuel cell, a storage tank, and a gas pump. Other hydrogen fuel replenishment systems and energy distribution networks are disclosed in U.S. Pat. Nos. 6,432,283, and 6,745,105.

There is a need for further improvements in energy stations for generating hydrogen for vehicles and for generating electricity and heat for a home or a building.

SUMMARY OF THE INVENTION

The present invention provides in a first aspect, an energy station which includes a generating unit and a dispensing unit. The generating unit includes a housing having an electrolyzer for generating hydrogen and a storage unit for storing hydrogen from the electrolyzer. The dispensing unit includes a housing for dispensing hydrogen from the generating unit. The generating unit is located at a first location and the dispensing unit is located at a second location away from the first location.

The present invention provides in a second aspect, an energy station for a building which includes a generating unit and a dispensing unit. The generating unit includes a housing having an electrolyzer for generating hydrogen, a compressor for compressing hydrogen from the purifier, a storage unit for storing hydrogen from the compressor, a heat exchanger for providing heat to a building, a fuel cell for generating electricity from the hydrogen, and an inverter for supplying electricity from the fuel cell to the building. The dispensing unit includes a housing and a nozzle for dispensing hydrogen from the generating unit. At least one of said generating unit and said dispensing unit further comprises controller for controlling the generating unit and dispensing unit. The generating unit is located at a first location and the dispensing unit is located at a second location away from the first location.

The present invention provides in a third aspect, a method for generating at least one of reformate and hydrogen for a vehicle in which the method includes providing the above-described energy stations, locating the generating unit outside a building in a first location, and locating the dispensing unit having access to a vehicle in a second location away from the first location.

The present invention provides in a fourth aspect, a method for generating at least one of reformate and hydrogen for a vehicle in which the method includes providing a generating unit for generating the at least one of reformate and hydrogen, providing a dispensing unit for dispensing the at least one of reformate and hydrogen from the generating unit, locating the generating unit outside a building in a first location, and locating the dispensing unit having access to the vehicle in a second location away from the first location. The method may also include providing the generating unit for generating electricity from the at least one of reformate and hydrogen, and providing the electricity to the building.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and accompanying drawings in which:

DETAILED DESCRIPTION OF THE INVENTION

Figure 1:
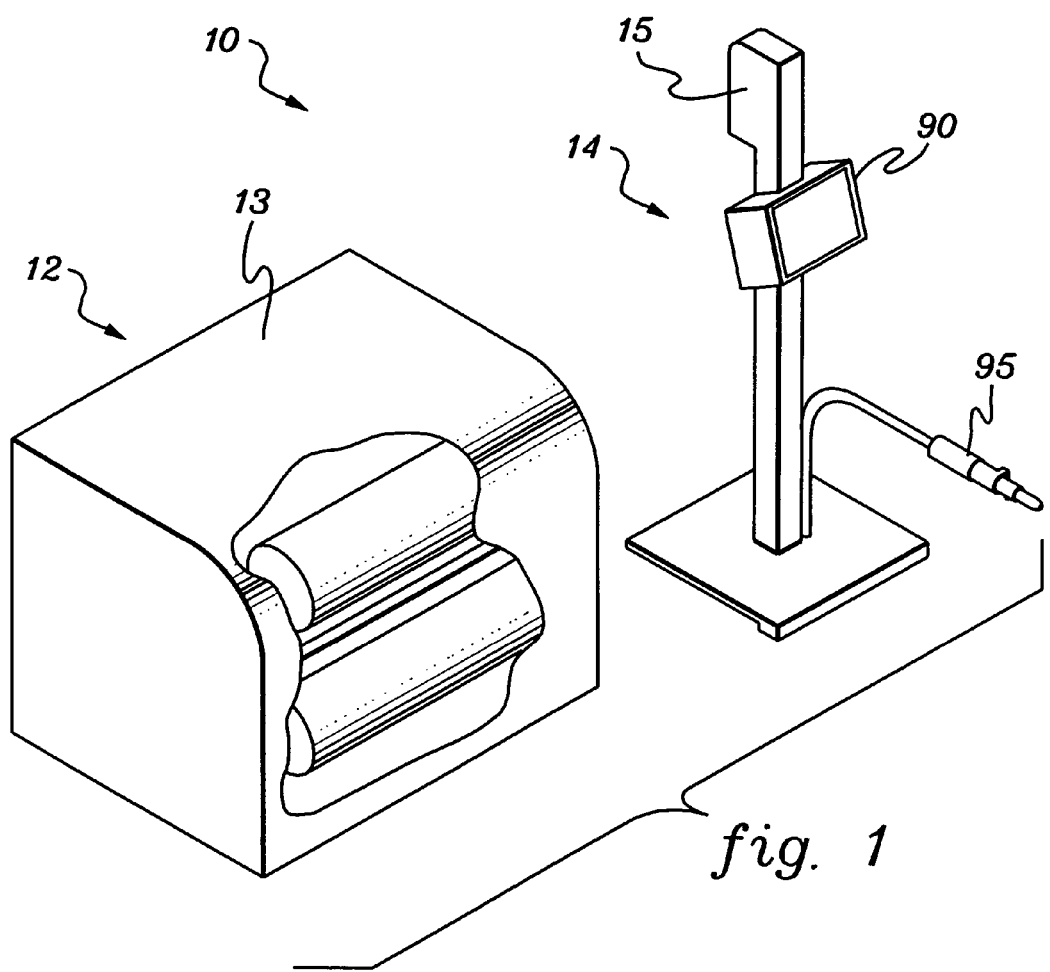
FIG. 1 is a perspective view of one embodiment of an energy station in accordance with the present invention.

FIG. 1 is an example of one embodiment of an energy station 10 in accordance with the present invention, which includes a generating unit 12 having a housing 13, and a separate dispensing unit 14 having a housing 15. Energy station 10 is operable for generating vehicle fuel (e.g., reformate or hydrogen gas), generating electricity for a home or a building, and generating heat for heating (or cooling through adsorptive chilling) water or air for use in the home or the building.

As will be appreciated by the description below, providing a separate generating unit 12 and dispensing unit 14, and remotely locating dispensing unit 14 away from generating unit 12 overcomes many of the problems associated with a combined generating and dispensing unit that are located together. For example, the present invention provides a dispensing unit that may be smaller than the generation unit. Thus, when the dispensing unit is placed near the garage of a home or a building, it presents a much smaller visual impact. The generation unit, which is typically larger than the dispensing unit, can be placed in a location, which does not draw attention such as behind or beside a home or a building. The generating unit may be placed at a location such as often used for air conditioners or other external appliances.

In addition, the dispensing unit may be configured so as to not store fuel. Thus, applicable codes and standards may allow for placement of the dispensing unit indoor such as inside a garage of a home or a building. The storage unit may reside in the generation unit, which may be located outside the garage.

Further, exhaust emitted from the energy station, for example via vents, containing flammable mixtures of gas may be located in the generation unit. Because the generating unit may be placed in a different location such as beside or behind a home or a building, codes and standards may be satisfied while still allowing the dispensing unit to be placed in a location which has vehicle access. For example, the generating unit may be placed away from doors or windows of a building so that the fuel such as hydrogen gas is inhibited from entering the building.

The dispensing unit may also be designed having a high profile such as at a height typical for adult use. The generation unit, which is separate, may be configured to have a lower height or profile so that it does not present an intrusive structure and also does not block windows or views.

Figure 2:
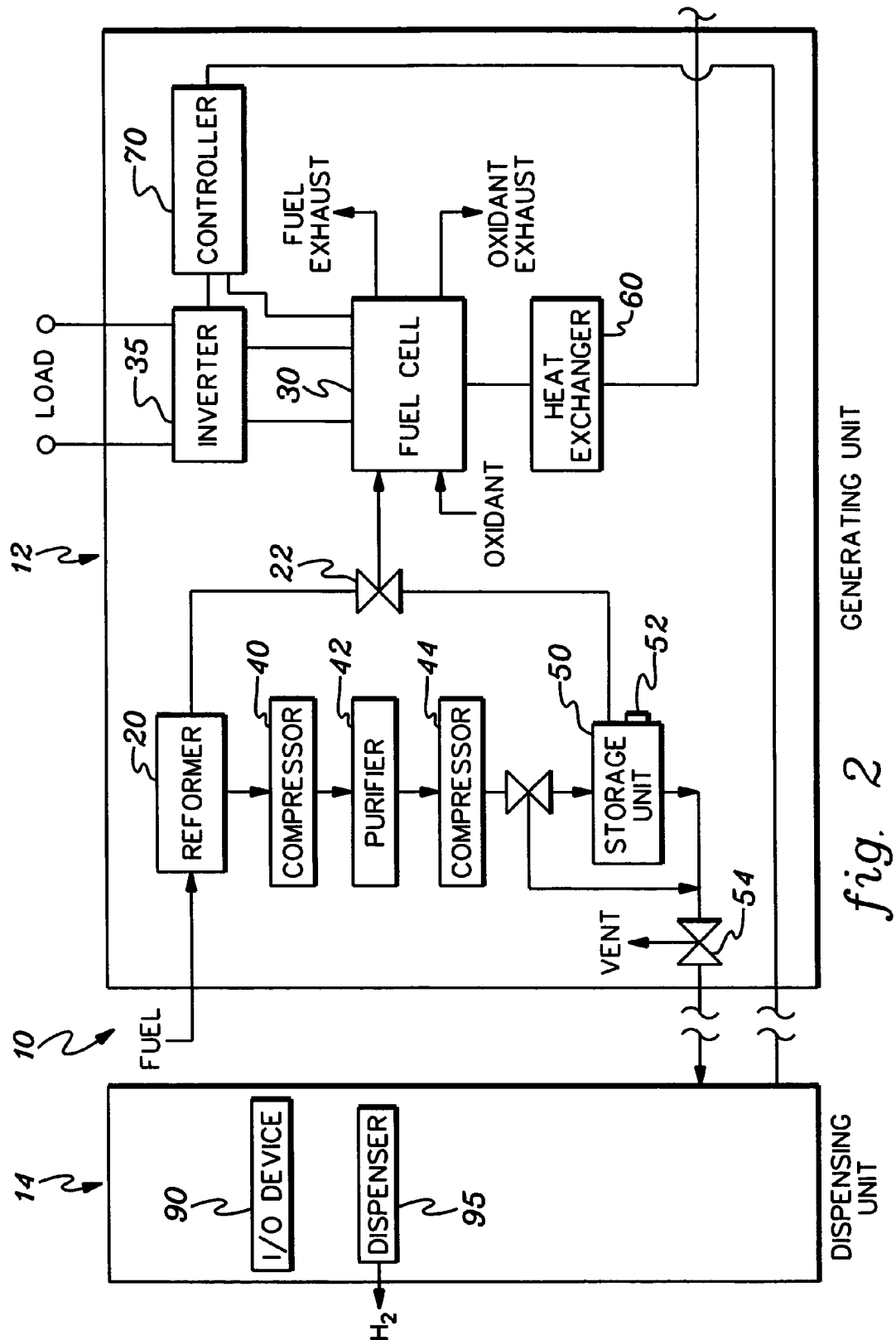
FIG. 2 is a diagrammatic illustration of the energy station of FIG. 1.

FIG. 2 diagrammatically illustrates energy station 10 which generally includes generating unit 12 having a reformer 20 such as a catalytic partial oxidation (CPO) reformer, a steam reformer, or an autothermal reformer for converting a hydrocarbon such as natural gas, methane, methanol, or other fuel into a hydrogen-rich gas stream (e.g., from a power company), a fuel cell 30 for generating electricity, a first compressor 40 for compressing reformate (e.g., a piston compressor, a diaphragm compressor, a scroll compressor, or other type of compressor), a clean up device or purifier 42 for removing impurities (e.g., a pressure swing absorber, a diffusion membrane purifier, thermal swing absorber, electrochemical hydrogen pump, or other type of purifier), a second compressor 44 such as a high pressure compressor (e.g., a piston compressor, a diaphragm compressor, or other type of compressor), a hydrogen storage unit 50 for storing the reformate, a heat exchanger 60 for removing heat from the fuel cell which may be used to heat (or cool via an absorptive chiller) a home or a building, and a controller 70. The various components may be connected with suitable conduits for the transfer of the fluids.

Controller 70 may include a mechanical switch or switches for controlling the flow of electricity to the home or the building via an inverter 35, and may be automated and further include a microprocessor or microcontroller. The controller may also be operably connected to the storage unit for receiving a signal from a sensor 52 on or in the storage unit for determining the level or amount of reformate in the storage unit. The controller may also control a vent 54 for depressurizing the line to the dispensing unit after delivery of hydrogen gas to the dispensing unit and to a vehicle. The controller may also be operably connected to the fuel cell, reformer, compressors, and heat exchanger. The controller may be operably linked to the various components or sensors using one or more wires, or suitably wirelessly connected. The controller may also suitably employ the features of the controller disclosed in U.S. Pat. No. 6,745,105, entitled "Energy Distribution Network", and the controller disclosed in U.S. Pat. No. 6,432,283, entitled "Hydrogen Fuel Replenishment Systems", the entire subject matter of these patents being incorporated herein by reference.

Dispensing unit 14 may include a user interface or input/output device 90 and a dispenser 95 such as a nozzle or connector (as best shown in FIG. 1). Input/output device 90 may include a touch screen display (as best shown in FIG. 1). One or more wires or cables and suitable pipes may operably connect dispensing unit 14 to controller 70 of generator unit 12.

It is also appreciated that fuel cell 70 may be fueled by reformate stored in storage unit 50 and controlled via a valve 22 by controller 70.

Figure 3:
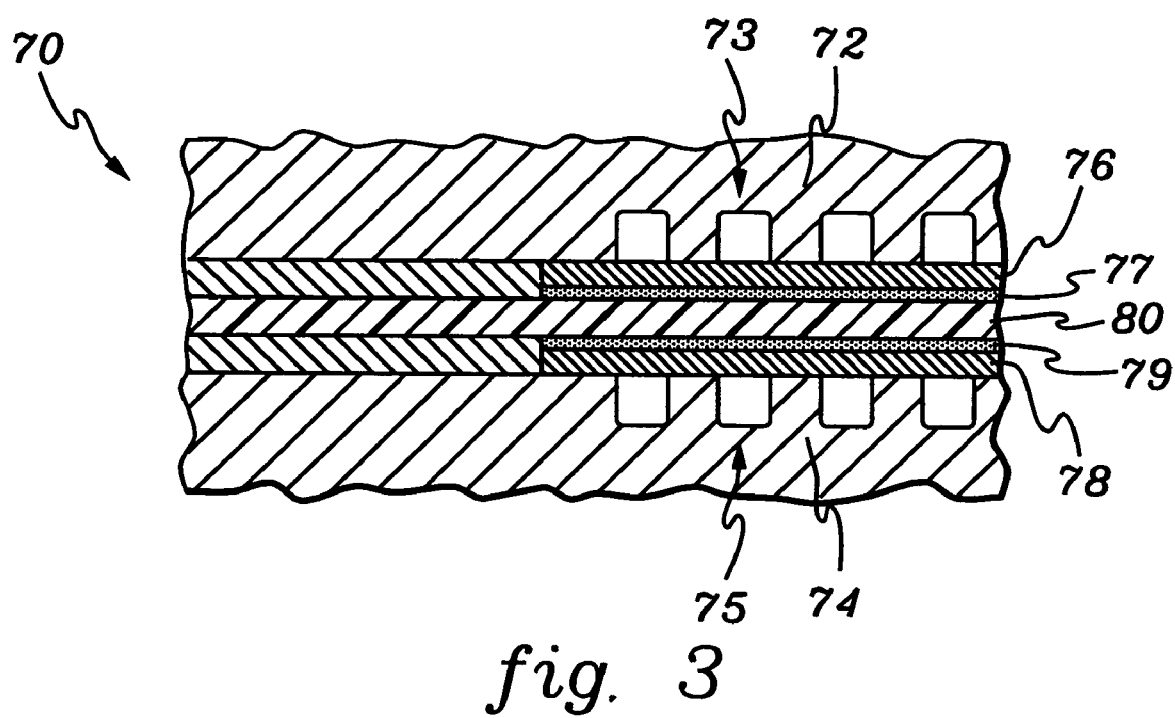
FIG. 3 is a cross-sectional view of one embodiment of an electrochemical cell in the fuel cell of the energy station of FIGS. 1 and 2.

FIG. 3 illustrates one embodiment of fuel cell 70 in accordance with the present invention for generating electricity from a supply of fuel containing hydrogen such as reformate and a supply of oxidant such as air. Fuel cell 70 may include an anode separator plate or member 72 attached to an anode inlet for receiving the supply of fuel and having flow channels 73 for distributing the supply of fuel, a cathode separator plate or member 74 connected to a cathode inlet for receiving the supply of oxidant and having flow channels 75 for distributing the supply of oxidant, and a proton conducting electrochemical cell sandwiched between the anode separator plate 72 and cathode separate plate 74.

The proton conducting electrochemical cell may include an anode gas diffusion layer 76 and an anode electrode 77 disposed adjacent to anode separator plate 72, a cathode gas diffusion layer 78 and a cathode electrode 79 disposed adjacent to the cathode separator plate 74, and a proton conducting medium 80 disposed between anode electrode 77 and cathode electrode 79.

The anode electrode may also comprise platinum or a platinum-ruthenium alloy catalyst layer. The proton conducting medium may include a proton exchange membrane (PEM) such as a NAFION perfluorosulfonic acid polymer membrane (available from E. I. DuPont de Nemours and Co., Wilmington, Del., USA).

When the fuel cell is operated, fuel is supplied to the anode side, oxidant is supplied to the cathode side, and a load is applied to the electrodes. Hydrogen moves from the fuel stream to the porous hydrogen permeable anode electrode where the hydrogen gas forms protons (H+) and electrons. The protons then migrate across the proton conducting medium and are conducted through the nonporous hydrogen permeable cathode electrode. The protons are combined with the oxidant and electrons to form water. Impurities and/or the build up of impurities (e.g., CO, N2, etc.) on the anode side are readily exhausted by the anode outlet.

While the fuel cell is illustrated as including one proton electrical chemical cell, it will be appreciated by those skilled in the art that the fuel cell in accordance with the present invention may comprise a plurality of or a stack of proton conducting electrochemical cells for generating electricity.

Figure 4:
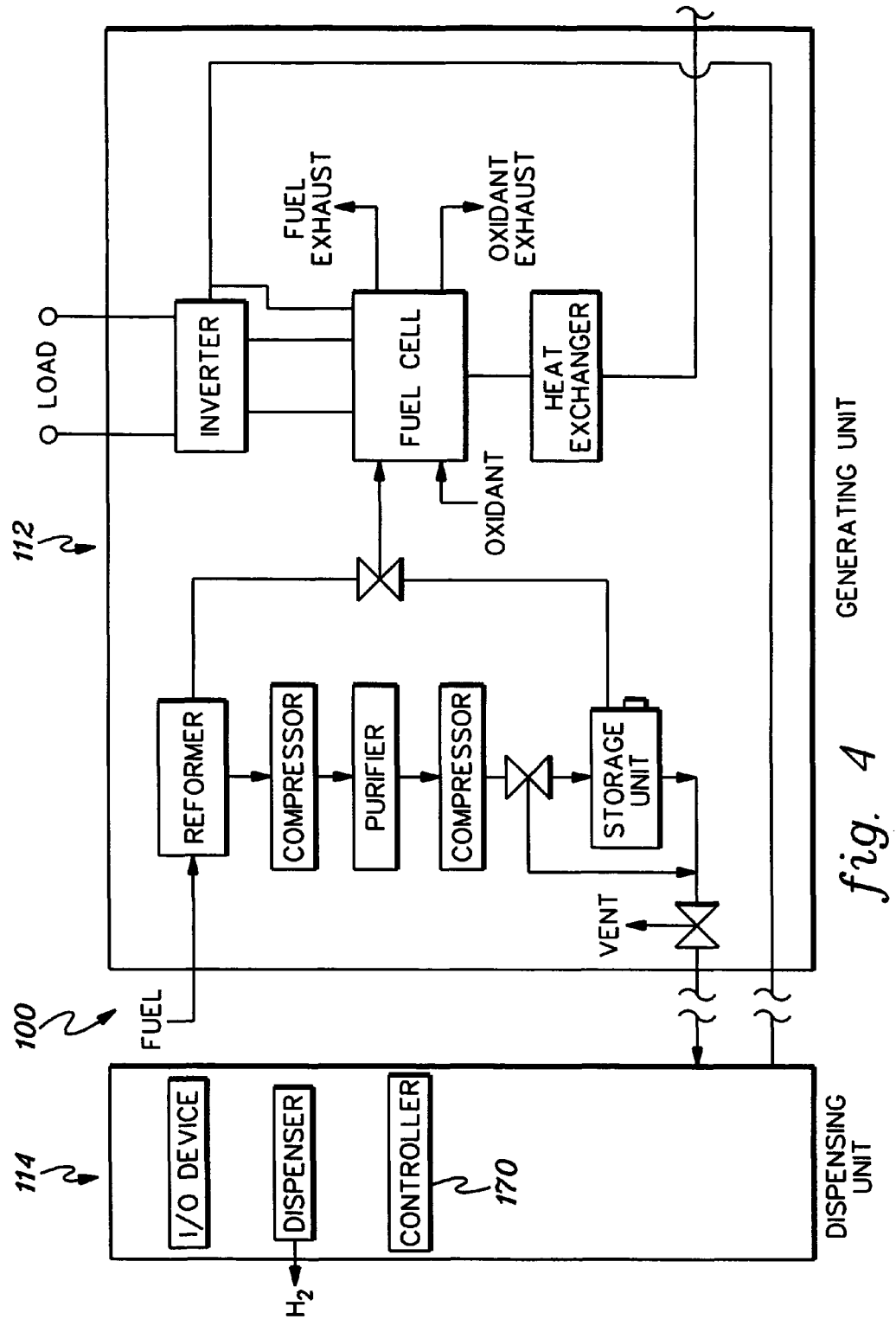
FIG. 4 is a diagrammatic illustration of another embodiment of an energy station in accordance with the present invention.

FIG. 4 diagrammatically illustrates another embodiment of an energy station 100 which is similar to energy station 10 of FIG. 1 with the exception that a controller 170 is located in the dispensing unit 114 and operably connected to the various components in the generating unit as opposed to being placed in generating unit 112. The dispensing unit and controller may be placed in a garage or other structure.

Figure 5:
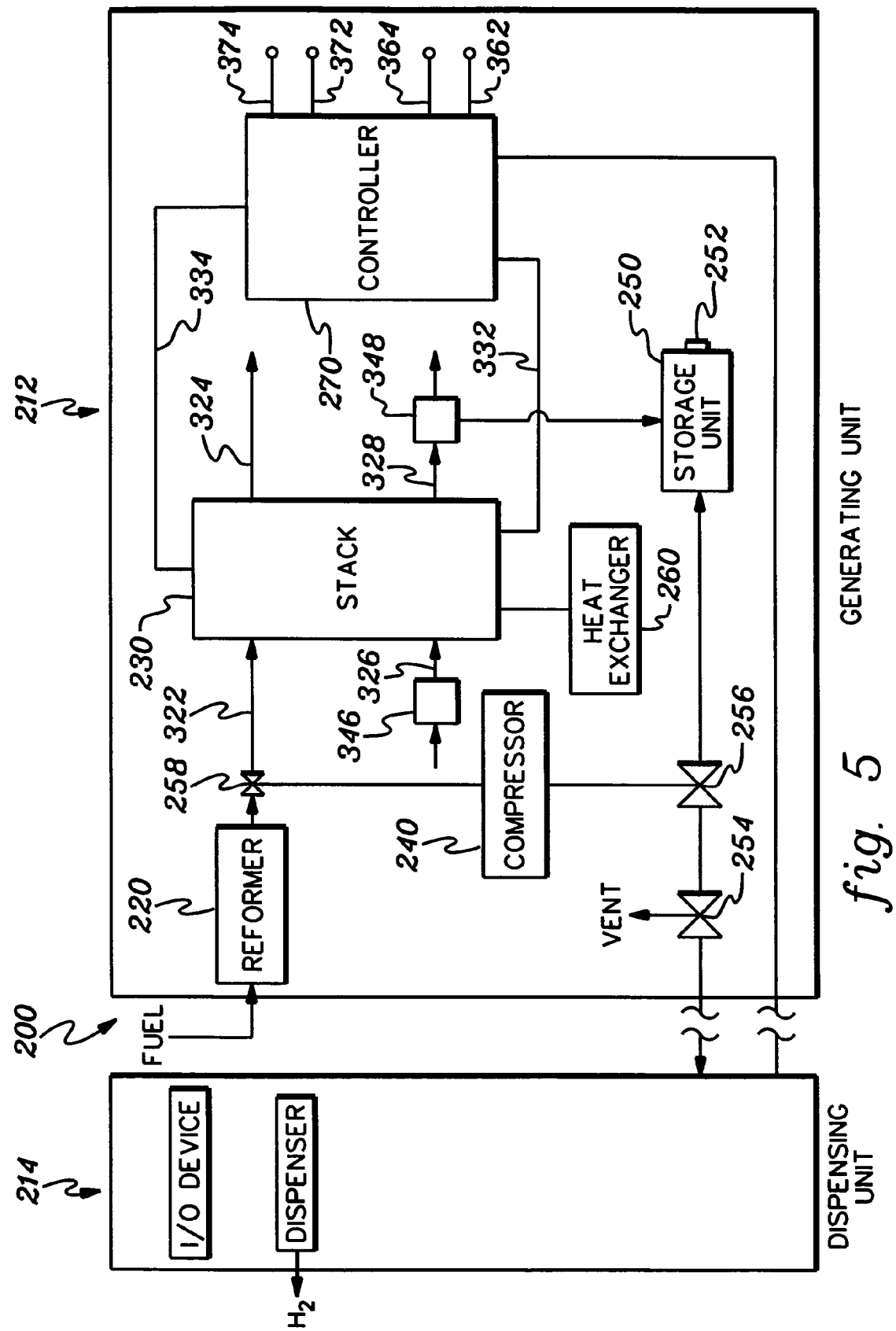
FIG. 5 is a diagrammatic illustration of another embodiment of an energy station in accordance with the present invention.

FIG. 5 diagrammatically illustrates still another embodiment of an energy station 200 in accordance with the present invention. Energy station 200 includes an electrochemical cell or stack that may be operated in either a fuel cell mode for generating electricity or a hydrogen pumping mode for purifying and/or compressing hydrogen. While two separate devices such as a fuel cell for generating electricity and a hydrogen pump for purifying and/or compressing hydrogen may be provided, the illustrated combination reduces the costs and also the space required compared to providing two separate devices.

Energy station 200 generally includes a generating unit 212 having a reformer 220 such as a catalytic partial oxidation (CPO) reformer, a steam reformer, or an autothermal reformer for converting a hydrocarbon such as natural gas, methane, methanol, or other fuel into a hydrogen-rich gas stream, an electrochemical cell or stack 230 (as explained below may be configured as a hydrogen pump for purifying the hydrogen-rich gas stream or configured as a fuel cell for generating electricity), a compressor 240 for compressing reformate, a hydrogen storage unit 250 for storing purified hydrogen gas or reformate, a heat exchanger 260 for removing heat from the fuel cell which may be used to heat (or cool via an absorptive chiller) a home or a building, and a controller 270. Controller 270 may include a mechanical switch or switches and an inverter for controlling the flow of electricity to the home or the building, and may be automated and further include a microprocessor or microcontroller.

The controller may also be operably connected to the storage unit for receiving a signal from a sensor 252 on or in the storage unit for determining the level or amount of reformate or hydrogen in the storage unit. The controller may also control a vent 254 for depressurizing the line to the dispensing unit after delivery of reformate or hydrogen gas to the dispensing unit and a vehicle. Controller 270 and a valve 256 may operably control the filling of storage unit 250 with purified compressed hydrogen gas from stack 230 or reformate from reformer 220. In addition, controller 270 and valve 265 and a valve 258 may be used to permit reformate or hydrogen stored in storage unit 250 to be used to fuel stack 230 for generating of electricity. The controller may also be operably connected to the fuel cell, reformer, compressor, and heat exchanger.

Dispensing unit 214 includes a user interface or input/output device and a dispenser such as a nozzle. The input/output device may include a touch screen display. One or more wires or cables and suitable pipes may operably connect dispensing unit 214 to controller 270 of generator unit 212.

Stack 230 generally includes at least one electrochemical cell (for example as illustrated in FIG. 3) having an anode inlet 322 for receiving a fuel such as reformate or purified hydrogen gas, an anode outlet 324 for exhausting the fuel, a cathode inlet 326 for receiving an oxidant such as air, a cathode outlet 328 for exhausting oxidant such as air or purified hydrogen, and a first electrical connector 332 and a second electrical connector 334 for applying an electrical load or an electrical potential to stack 230.

A first valve 346 is attached to cathode inlet 326 for controlling oxidant to stack 230. A second valve 348, for example a three-way valve, is attached to cathode outlet 328 for either exhausting oxidant from stack 230 in a first direction or exhausting purified hydrogen in a second direction different from the first direction.

Controller 270 is attached to first electrical connector 332 and second electrical connector 334 for applying either an electrical load to stack 230 for generating electricity, or an electrical potential to stack 230 for purifying hydrogen. Controller 270 may include electrical output terminals 362 and 364 for applying an electrical load to stack 230. Controller 270 may also include electrical input terminals 372 and 374 for applying an electrical potential to stack 230. Controller 270 may include mechanical switch or switches or may be automated and include a microprocessor or microcontroller.

Figure 6:
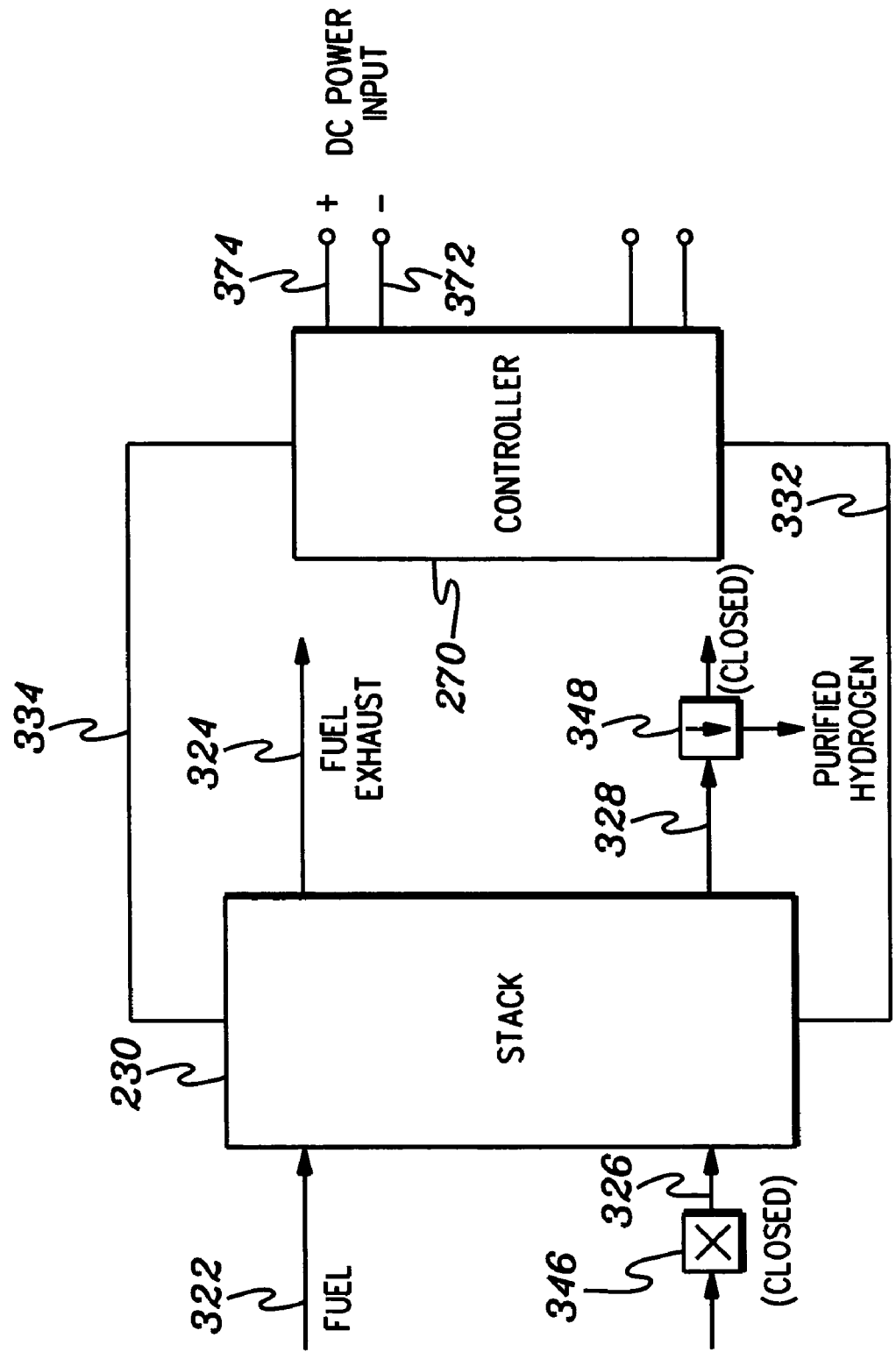
FIG. 6 is a diagrammatic illustration of the energy station of FIG. 5 configured for generating hydrogen.

FIG. 6 illustrates a portion of generating unit 212 of energy station 200 configured for operation for generating a supply of purified hydrogen. In this illustrated embodiment, the stack operates as a hydrogen pump for separating, removing, and/or compressing pure hydrogen from an input supply containing hydrogen such as reformate.

For example, fuel such as reformate is supplied to anode inlet 322 and exhausted via anode outlet 324, first valve 346 is operated to close or block the supply of oxidant to cathode inlet 326, and second valve 348 is operated to direct purified hydrogen in a second direction (e.g., the first direction for directing exhaust oxidant as shown in FIG. 6 is closed or blocked). Electrical input terminals 372 and 374 of controller 270 may be connected to a power supply for providing an electrical potential across stack 230 via electrical connectors 332 and 334.

In the configuration of a hydrogen pump mode, fuel flows into the electrochemical cell anode, electrical energy is supplied between the electrodes to overcome the internal resistance of the electrochemical cell, dissociate the hydrogen in the gas-to-be-treated to protons, and drive the protons through the membrane to the opposite side for recovery as purified and/or pressurized hydrogen at the cathode outlet. The hydrogen stream may be stored or may be humidified by introduction of water and then stored. Humidified purified hydrogen may also be generated using an electrochemical cell having a NAFION membrane which allows the transfer of water as well as hydrogen.

Figure 7:
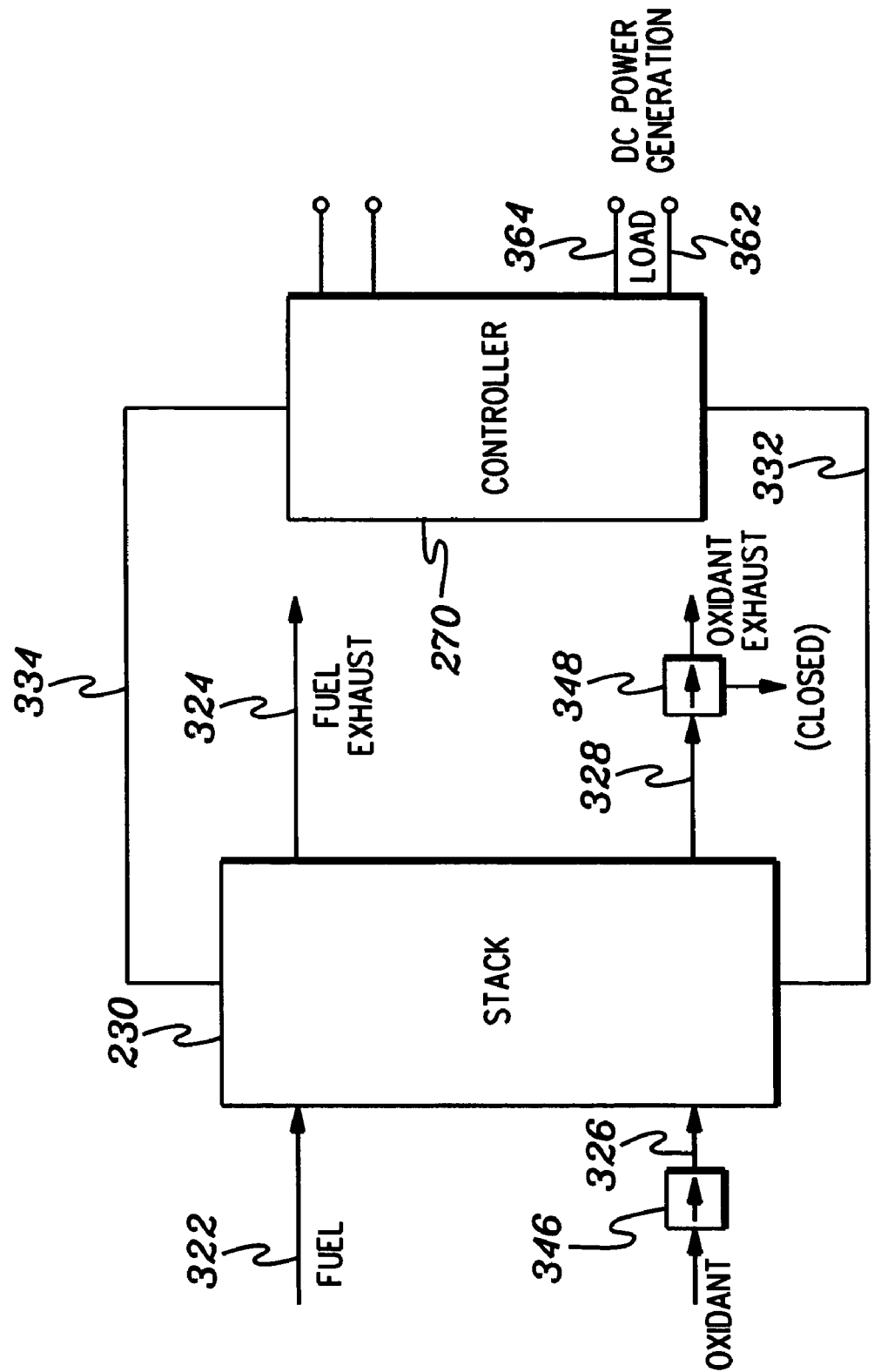
FIG. 7 is a diagrammatic illustration of the energy station of FIG. 5 configured for generating electricity.

FIG. 7 illustrates a portion of generating unit 212 of energy station 200 configured for operation for generating electricity. In this illustrated embodiment, the stack operates as a fuel cell for generating electricity.

For example, fuel is supplied to anode inlet 322 and exhausted via anode outlet 324, first valve 346 is operated to allow a supply of oxidant to cathode inlet 326, and second valve 348 is operated to exhaust oxidant from cathode outlet 328 in a first direction, e.g., to a vent. Electrical output terminals 362 and 364 of controller 270 are connected to an electrical load which load is applied across stack 230 via electrical connectors 332 and 334.

In the configuration in a fuel cell mode, fuel such as reformate flows into the electrical chemical cell anode, a catalyst coating on the anode helps to separate the gas into protons (hydrogen ions) and electrons. The electrolyte membrane in the center allows only the protons to pass through the membrane to the cathode side of the electrochemical cell. The electrons cannot pass through this membrane and flow through an external circuit in the form of electric current. As oxidant (e.g., oxygen in air) flows into the fuel cell cathode, another catalyst coating helps the oxygen, protons, and electrons combine to produce pure water and heat.

Suitable combinations of fuel cells and hydrogen pumps which may be employed in the present invention are disclosed in U.S. patent application Ser. No. 10/658,123, which published as U.S. Patent Application Publication No. 20050053813, and in which the entire subject matter thereof is incorporated herein by reference.

Figure 8:
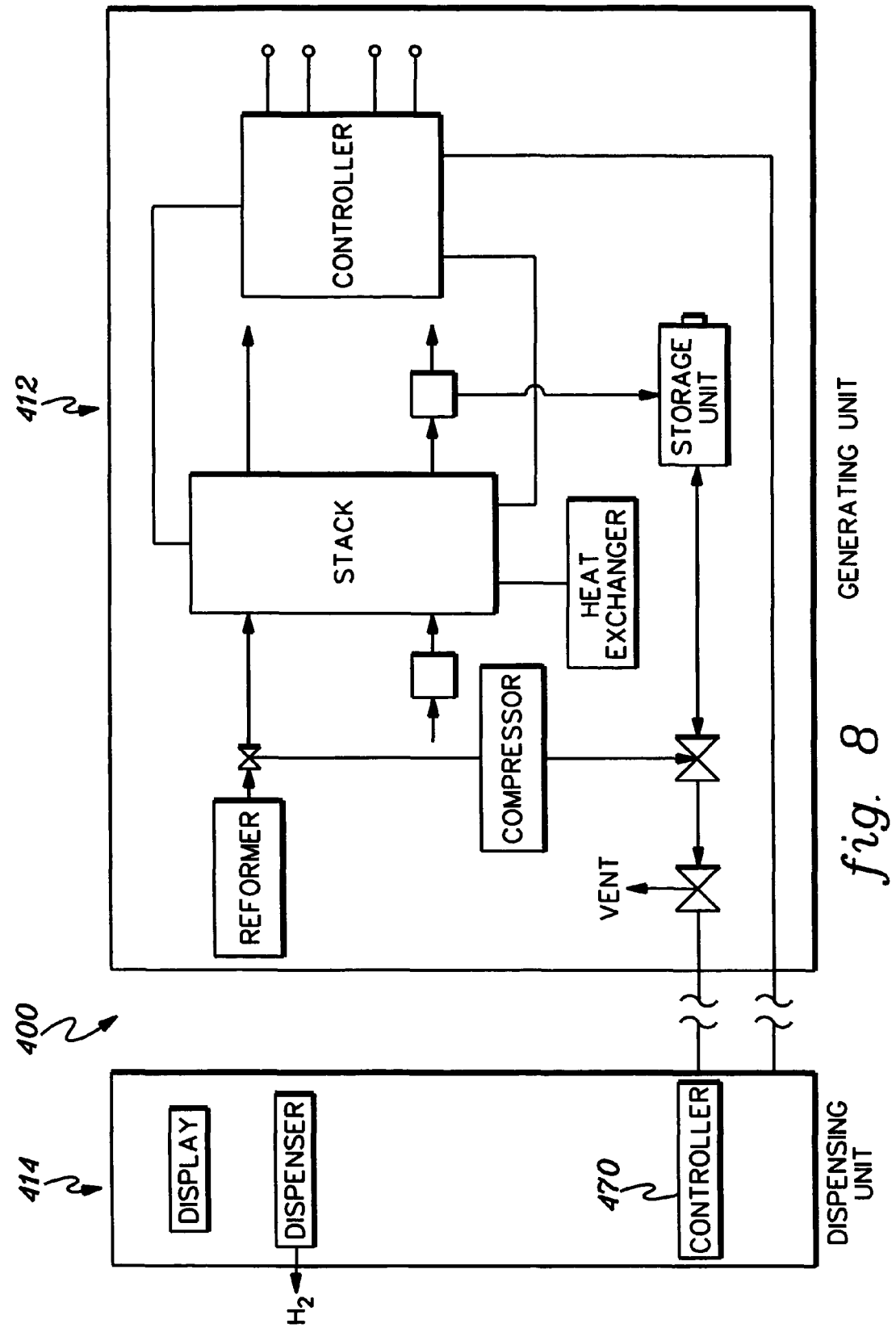
FIG. 8 is a diagrammatic illustration of another embodiment of an energy station in accordance with the present invention.

FIG. 8 diagrammatically illustrates another embodiment of an energy station 400, which is similar to energy station 200 of FIG. 5 with the exception that a controller 470 is located in the dispensing unit 414 and operably connected to the various components in the generating unit as opposed to being placed in generating unit 412. Thus, the dispensing unit and controller may be place in a garage or other structure.

Figure 9:
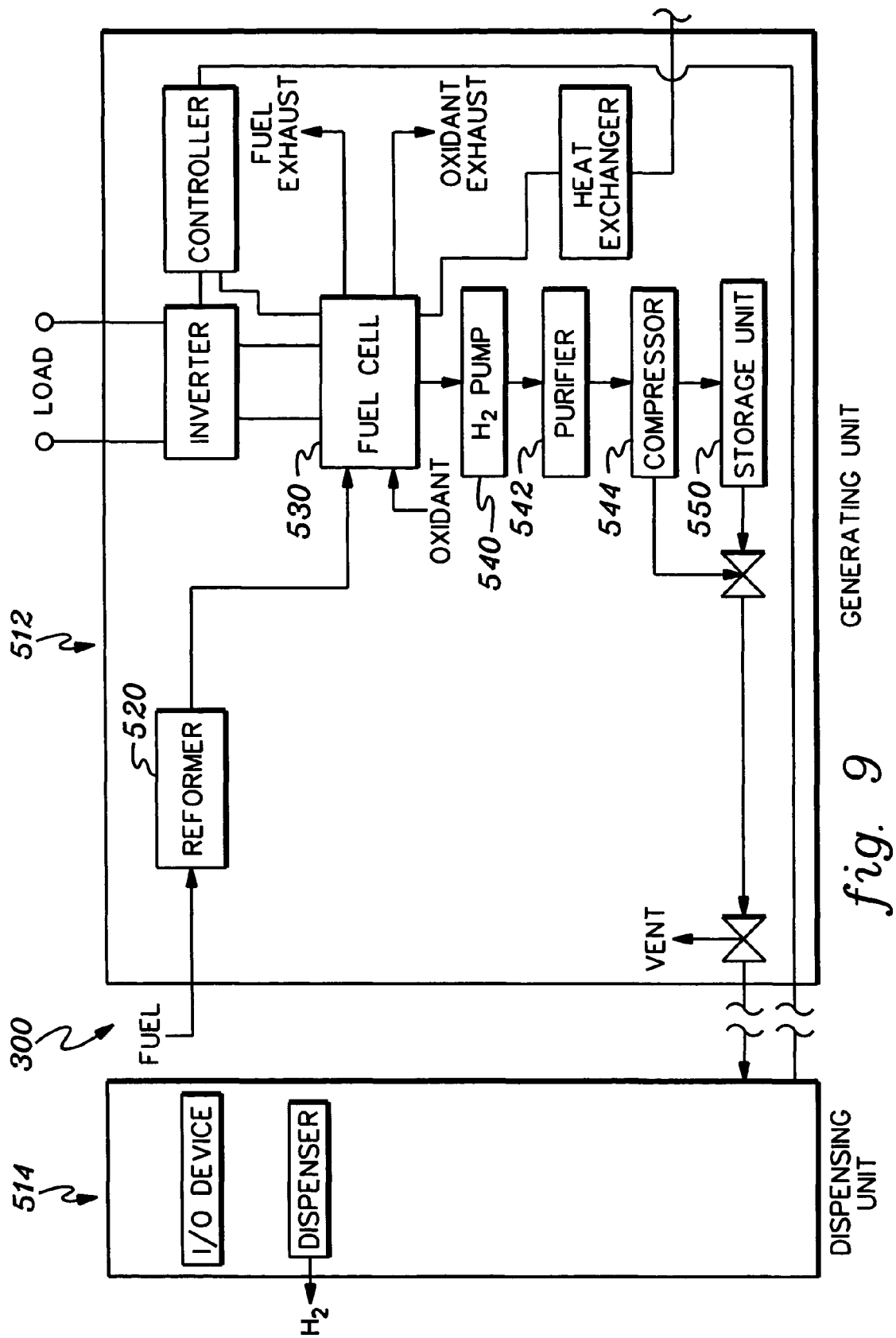
FIG. 9 is a diagrammatic illustration of another embodiment of an energy station in accordance with the present invention.

FIG. 9 diagrammatically illustrates another embodiment of an energy station 500, which includes a generating unit 512 and a separate dispensing unit 514. In this illustrated embodiment, in the generating unit, reformate from a reformer 520 is supplied to a fuel cell 530, exhaust reformat from the fuel cell is process by a hydrogen pump 540 such as a hydrogen pump stack, purified by a purifier 542, and further compressed by a compressor 544 prior to storage in a storage unit 550.

Figure 10:
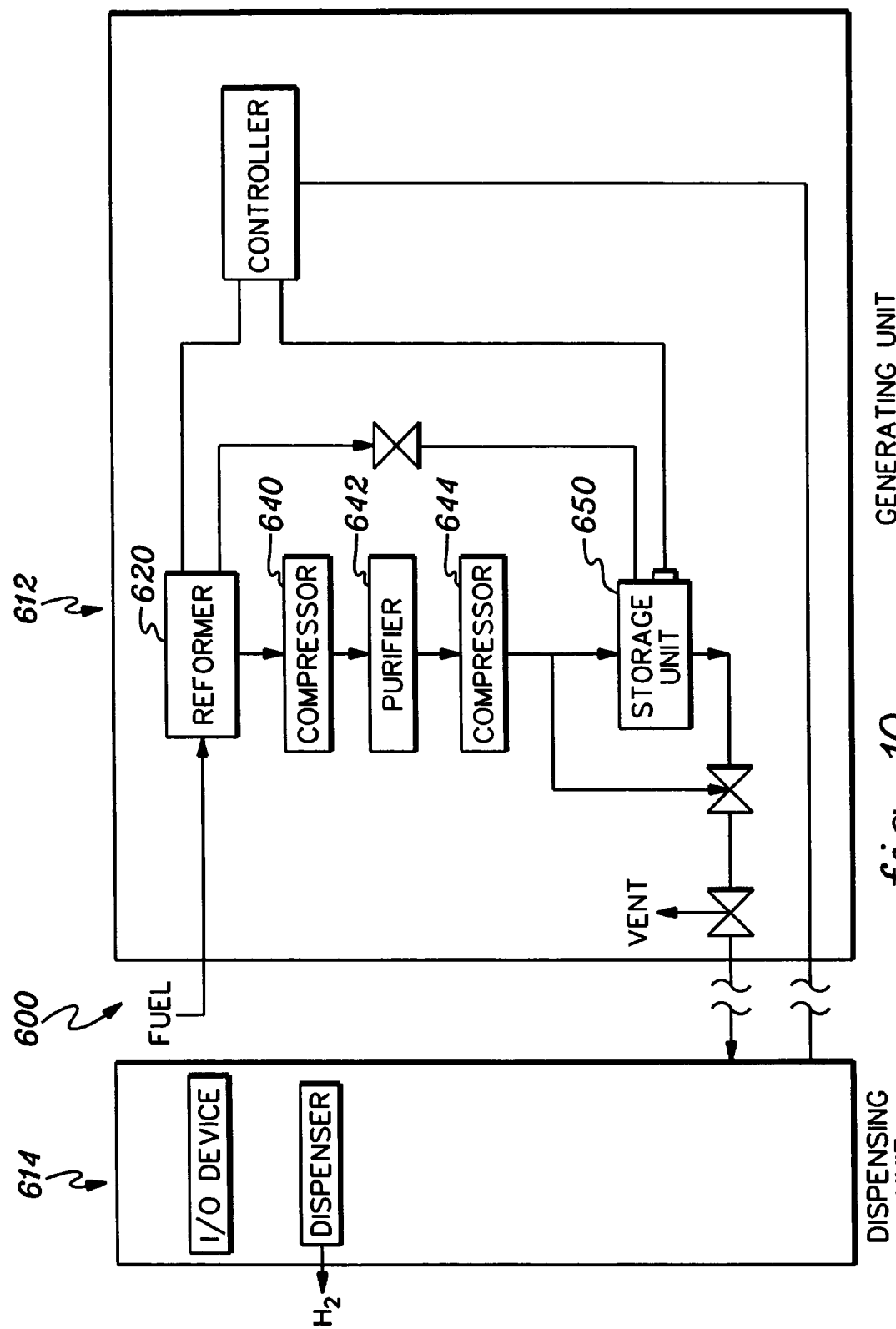
FIG. 10 is a diagrammatic illustration of another embodiment of an energy station in accordance with the present invention.

FIG. 10 diagrammatically illustrates another embodiment of an energy station 600, which includes a generating unit 612 and a separate dispensing unit 614. Energy station 600 generates hydrogen but does not generate electricity. In this illustrated embodiment, in the generating unit, reformate from a reformer 620 is supplied to a compressor 640, purified by a purifier 642, and further compressed by a compressor 644 prior to storage in a storage unit 650.

Figure 11:
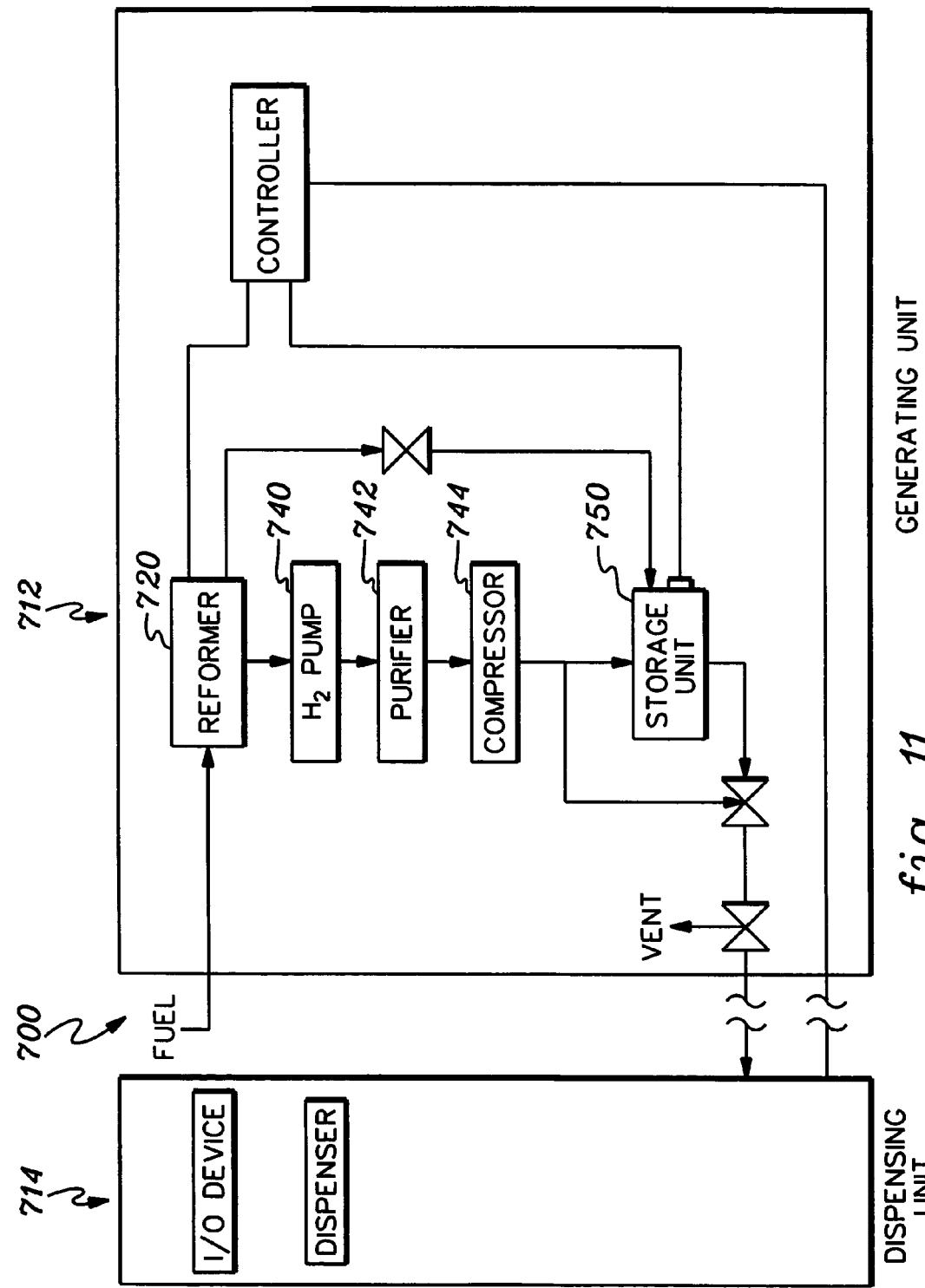
FIG. 11 is a diagrammatic illustration of another embodiment of an energy station in accordance with the present invention.

FIG. 11 diagrammatically illustrates another embodiment of an energy station 700, which is similar to energy station 600 of FIG. 10 with the exception that reformate from a reformer 720 is supplied to a hydrogen pump 740 such as a hydrogen pump stack. Hydrogen from the hydrogen pump is then purified by a purifier 742, and further compressed by a compressor 744 prior to storage in a storage unit 750.

Figure 12:
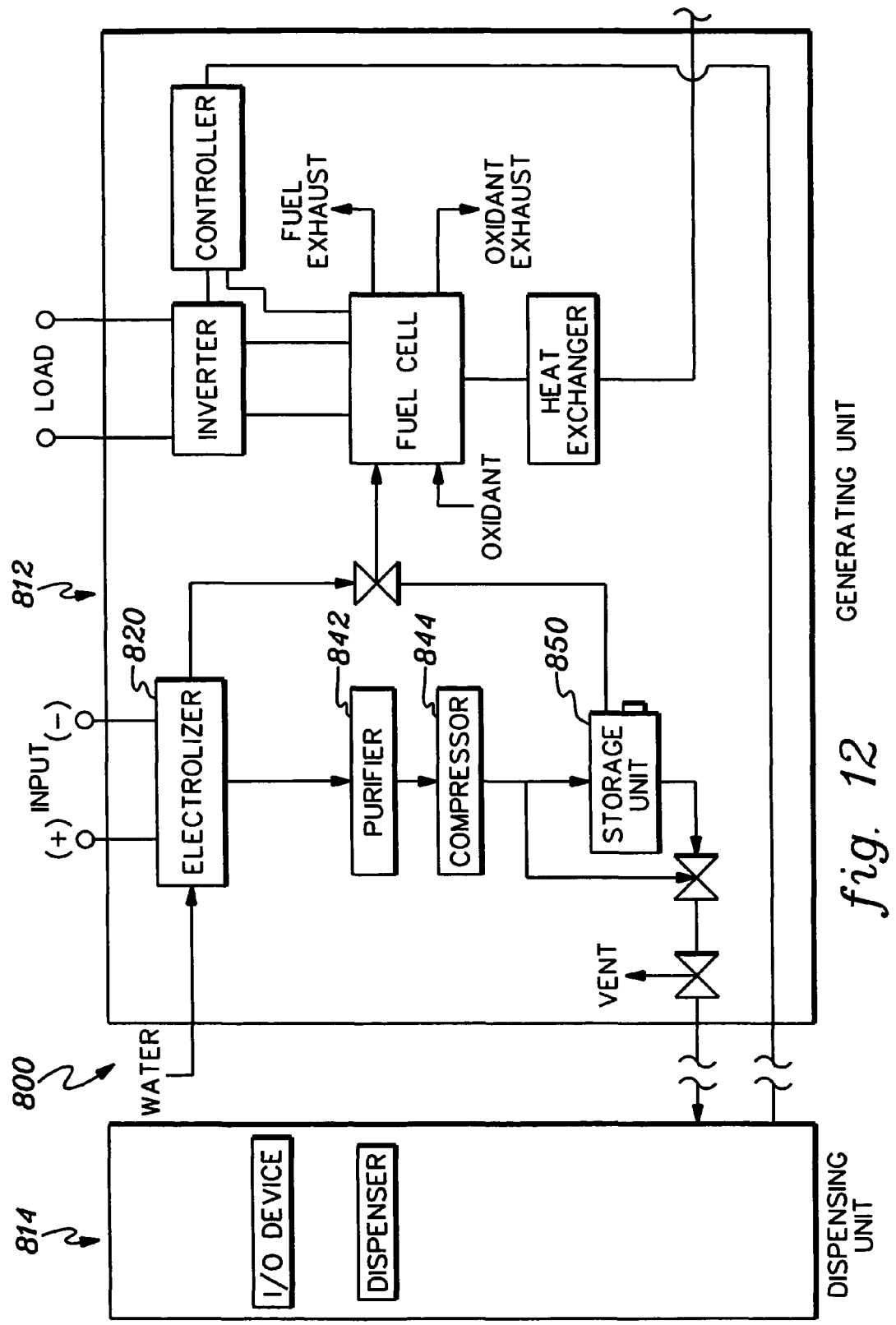
FIG. 12 is a diagrammatic illustration of another embodiment of an energy station in accordance with the present invention.

FIG. 12 diagrammatically illustrates another embodiment of an energy station 800, which is similar to energy station 10 of FIG. 2 with the exception that water (e.g., from a municipal water supply) is supplied to an electrolyzer 820. Electrical power such as a DC power input is supplied to the electrolyzer and hydrogen generated in the electrolyzer is then supplied to a purifier 842, and further compressed by a compressor 844 prior to storage in a storage unit 850.

Figure 13:
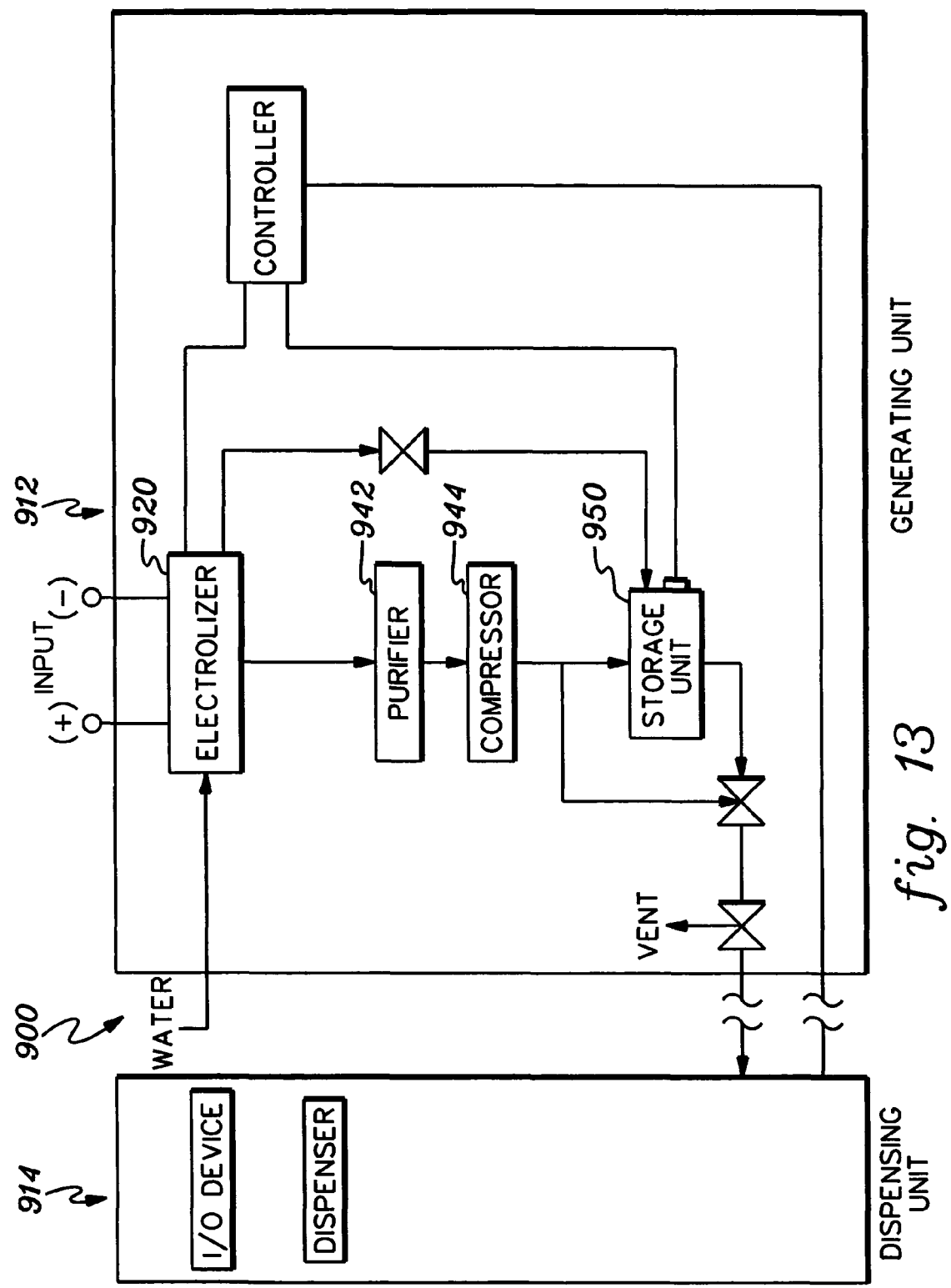
FIG. 13 is a diagrammatic illustration of another embodiment of an energy station in accordance with the present invention.

FIG. 13 diagrammatically illustrates another embodiment of an energy station 900, which includes a generating unit 912 and a separate dispensing unit 914 similar to energy station 600 of FIG. 10 with the exception that water (e.g., from a municipal water supply) is supplied to an electrolyzer 920. Energy station 900 generates hydrogen but does not generate electricity. In this illustrated embodiment, in the generating unit, hydrogen from the electrolyzer is supplied to a purifier 942, and further compressed by a compressor 944 prior to storage in a storage unit 950.

Additional embodiments of the present invention may include making the storage capacity of the system modular. This can be done by either placing the fuel inventory storage in a separate enclosure, or by making it modular within the generation unit enclosure. By making the storage capacity modular, a user of the energy station can select different amounts of hydrogen storage capacity depending upon the needs of their family or business. For example, if the user has two vehicles, they might select twice the standard fuel storage capacity. Or, if the user has a very large household load, they might select more storage capacity to allow generation of more power during peak periods. Or, if the user lives in a location where the grid is particularly unreliable, the user might select five or even ten times the normal storage capacity to ensure that there is a large inventory of fuel available for grid outages.

Although a single controller is illustrated in the drawing for controlling the fuel cell or stack, and also the dispensing of hydrogen via the dispensing unit, it will be appreciated that two or more controller may control one or more different aspects of the energy stations. For example, a controller may control the fuel cell or stack while another controller controls the dispensing of hydrogen to a vehicle.

From the present description, it will be appreciated that the proton conducting medium may also include solid anhydrous (e.g., not having water) proton conducting mediums, for example, solid state conductors such as inorganic and ceramic based stations, perovskite ceramics, solid-acids such as cesium dihydrogen phosphate ($CsH_2PO_4$), or other suitable solid anhydrous proton conducting mediums. In addition, the proton conducting medium may include a polybenzimidazole (PBI) polymer membrane, a polyetheretherketones (PEEK), sulfonated polysulfones, a polyimide, a hydrocarbon membrane, a polytrifluoro-styrenesulfonic acid, variations of perfluorosulfonic acid membranes, other polymeric or non-polymeric proton conductors including any strong acids.

While various embodiments of the present invention have been illustrated and described, it will be appreciated by those skilled in the art that many further changes and modifications may be made thereunto without departing from the spirit and scope of the invention.

The invention claimed is:

1. A method for generating hydrogen for a vehicle, the method comprising:
   providing an energy station comprising:
      a generating unit comprising a housing having an electrolyzer for generating hydrogen, and a storage unit for storing hydrogen from the electrolyzer; and
      a dispensing unit comprising a housing for dispensing hydrogen from the generating unit;
   locating the generating unit outdoor in a first location away from the vehicle; and
   locating the dispensing unit having access to the vehicle indoor away from the vehicle in a second location, the second location being away from the first location,
   wherein the generating unit located outdoor is connected to the dispensing unit located indoor.

2. The method of claim 1 wherein the first location is on a side or in the back of the home.

3. The method of claim 1 further comprising providing heat from the generating unit to the home.

4. A method for generating hydrogen for a vehicle, and energy for a home, the method comprising:
   providing an energy station comprising:
      a generating unit comprising a housing having:
         an electrolyzer for generating hydrogen;
         a purifier for purifying the hydrogen from the electrolyzer;
         a compressor for compressing the hydrogen from the purifier;
         a storage unit for storing the hydrogen from the compressor;
         a heat exchanger for providing heat to the building;
         a fuel cell for generating electricity from the hydrogen; and
         an inverter for supplying electricity from the fuel cell to the home;
      a dispensing unit comprising a housing and a nozzle for dispensing the hydrogen from the generating unit; and at least one of the generating unit and the dispensing unit further comprising a controller for controlling the generating unit and the dispensing unit;
locating the generating unit outdoor in a first location away from the vehicle; and
locating the dispensing unit having access to the vehicle indoor away from the vehicle in a second location, the second location being away from the first location,
wherein the generating unit located outdoor is connected to the dispensing unit located indoor.

5. The method of claim 4 wherein the first location is on a side or in the back of the home.

6. The method of claim 4 further comprising providing heat from the generating unit to the home.

7. A method for generating hydrogen for a vehicle, the method comprising:
providing a generating unit comprising an electrolyzer for generating the hydrogen;
providing a dispensing unit for dispensing the hydrogen from the generating unit;
locating the generating unit outdoor in a first location away from the vehicle; and
locating the dispensing unit having access to the vehicle indoor away from the vehicle in a second location, the second location being away from the first location,
wherein the generating unit located outdoor is connected to the dispensing unit located indoor.

8. The method of claim 7 wherein the first location is on a side or in the back of the home.

9. The method of claim 7 further comprising providing heat from the generating unit to the home.

10. The method of claim 7 wherein the providing the generating unit comprises providing the generating unit for generating electricity for the home from the hydrogen, and further comprising providing the electricity to the home.

11. The method of claim 7 wherein the providing the generating unit comprises providing the generating unit having a housing having a first height, the providing a dispensing unit comprises providing the dispensing unit having a second height greater than the first height.

12. The method of claim 1 wherein the housing of the generating unit comprises a first height and the housing of the dispensing unit comprises a second height greater than the first height.

13. The method of claim 1 wherein the generating unit further comprises at least one of a compressor and a hydrogen pump for supplying compressed hydrogen to the storage unit.

14. The method of claim 1 wherein the generating unit further comprises a purifier for purifying the hydrogen from the electrolyzer, and a compressor for compressing the hydrogen from the purifier and supplying compressed hydrogen to the storage unit.

15. The method of claim 1 wherein at least one of the generating unit and the dispensing unit further comprises a controller for controlling the generating unit and the dispensing unit.

16. The method of claim 1 wherein the generating unit further comprises a vent for venting the hydrogen from the dispensing unit disposed indoor inside the garage of the home after supplying the hydrogen to the vehicle.

17. The method of claim 1 wherein the dispensing unit comprises a nozzle for dispensing the hydrogen to the vehicle.

18. The method of claim 1 wherein the generating unit further comprises a heat exchanger for providing heat to the home.

19. The method of claim 1 wherein the generating unit further comprises a fuel cell for generating electricity for the home from the hydrogen.

20. The method of claim 19 wherein the generating unit further comprises a valve for supplying stored hydrogen in the storage unit to the fuel cell.

21. The method of claim 19 wherein at least one of the generating unit and the dispensing unit further comprises a controller for controlling the electrolyzer, the fuel cell, and the dispensing unit.

22. The method of claim 19 wherein the generating unit further comprises an inverter for supplying electricity from the fuel cell to the home.

23. The method of claim 4 wherein the housing of the generating unit comprises a first height and the housing of the dispensing unit comprises a second height greater than the first height.

24. The method of claim 4 wherein the generating unit further comprises a vent for venting the hydrogen from the dispensing unit disposed indoor inside the garage of the home after supplying the hydrogen to the vehicle.

25. The method of claim 4 wherein the generating unit further comprises a valve for supplying stored hydrogen in the storage unit to the fuel cell.

26. The method of claim 4 wherein the dispensing unit comprises a user interface for displaying the status of the generating unit.

27. The method of claim 1 further comprising supplying water to the electrolyzer from a municipal water supply.

28. The method of claim 1 wherein the locating the generating unit comprises locating the generating unit on a surface of the ground outside the home, and the locating the dispensing unit comprises locating the dispensing unit having access to the vehicle indoor on a surface in the garage of the home in a second location away from the first location.

29. The method of claim 28 wherein the providing the generating unit comprises providing the generating unit having a housing having a first height, the providing a dispensing unit comprises providing the dispensing unit having a second height greater than the first height.

30. The method of claim 4 further comprising supplying water to the electrolyzer from a municipal water supply.

31. The method of claim 4 wherein the locating the generating unit comprises locating the generating unit on a surface of the ground outside the home, and the locating the dispensing unit comprises locating the dispensing unit having access to the vehicle indoor on a surface in the garage of the home in a second location away from the first location.

32. The method of claim 31 wherein the providing the generating unit comprises providing the generating unit having a housing having a first height, the providing a dispensing unit comprises providing the dispensing unit having a second height greater than the first height.

33. The method of claim 7 further comprising supplying water to the electrolyzer from a municipal water supply.

34. The method of claim 7 wherein the locating the generating unit comprises locating the generating unit on a surface of the ground outside the home, and the locating the dispensing unit comprises locating the dispensing unit having access to the vehicle indoor on a surface in the garage of the home in a second location away from the first location.

35. The method of claim 34 wherein the providing the generating unit comprises providing the generating unit having a housing having a first height, the providing a dispensing unit comprises providing the dispensing unit having a second height greater than the first height.

* * * * *